United States Patent
Yoo et al.

(10) Patent No.: US 11,924,666 B2
(45) Date of Patent: Mar. 5, 2024

(54) TECHNIQUES FOR DEMODULATION REFERENCE SIGNAL BASED SIGNAL-TO-NOISE RATIO FOR DEMODULATION PROCESSING

(71) Applicant: QUALCOMM Incorporated, San Diego, CA (US)

(72) Inventors: Jae Won Yoo, San Diego, CA (US); Hari Sankar, San Diego, CA (US); Alexei Yurievitch Gorokhov, San Diego, CA (US); Ashok Mantravadi, San Diego, CA (US); Weng Chon Ao, Los Angeles, CA (US); Paolo Minero, La Jolla, CA (US); Abhinav Sridhar, Boston, MA (US); Shriram Swaminathan, San Jose, CA (US); Gi Hong Song, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 150 days.

(21) Appl. No.: 17/647,805

(22) Filed: Jan. 12, 2022

(65) Prior Publication Data

US 2022/0225146 A1 Jul. 14, 2022

Related U.S. Application Data

(60) Provisional application No. 63/172,827, filed on Apr. 9, 2021, provisional application No. 63/136,932, filed on Jan. 13, 2021.

(51) Int. Cl.
*H04W 24/10* (2009.01)
*H04B 17/318* (2015.01)
(Continued)

(52) U.S. Cl.
CPC .......... *H04W 24/10* (2013.01); *H04B 17/318* (2015.01); *H04B 17/336* (2015.01); *H04L 5/0051* (2013.01); *H04W 56/001* (2013.01)

(58) Field of Classification Search
CPC .. H04W 24/10; H04W 56/001; H04B 17/318; H04B 17/336; H04L 5/0051; H04L 5/006
See application file for complete search history.

(56) References Cited

U.S. PATENT DOCUMENTS

2011/0019749 A1 1/2011 Wilhelmsson et al.
2011/0286499 A1* 11/2011 Panicker ............... H04L 25/022
375/261

(Continued)

FOREIGN PATENT DOCUMENTS

CN 112865891 A * 5/2021 ............... G06N 3/08

OTHER PUBLICATIONS

International Search Report and Written Opinion—PCT/US2022/070167—ISA/EPO—dated May 16, 2022.

*Primary Examiner* — Deepa Belur
(74) *Attorney, Agent, or Firm* — Dalei Dong; Harrity & Harrity, LLP

(57) ABSTRACT

Various aspects of the present disclosure generally relate to wireless communication. In some aspects, a user equipment (UE) may measure a first energy level of a demodulation reference signal (DMRS). The UE may measure a second energy level of at least one of a tracking reference signal (TRS) or a synchronization signal block (SSB). The UE may determine, based at least in part on the first energy level and the second energy level, a DMRS signal-to-noise ratio (SNR). The UE may perform, based at least in part on the DMRS SNR, channel estimation for a physical channel associated with a communication to determine an estimated channel. The UE may perform, based at least in part on the (Continued)

estimated channel, demodulation processing for the communication. Numerous other aspects are described.

30 Claims, 8 Drawing Sheets

(51) Int. Cl.
*H04B 17/336* (2015.01)
*H04L 5/00* (2006.01)
*H04W 56/00* (2009.01)

(56) References Cited

U.S. PATENT DOCUMENTS

| | | | |
|---|---|---|---|
| 2015/0229493 A1* | 8/2015 | Lee | H04L 25/0234 370/252 |
| 2016/0381670 A1* | 12/2016 | Kim | H04L 5/0064 370/329 |
| 2020/0145866 A1 | 5/2020 | Onggosanusi et al. | |
| 2020/0145918 A1* | 5/2020 | Ji | H04W 52/0229 |
| 2022/0116176 A1* | 4/2022 | Yu | H04L 5/0094 |
| 2022/0312400 A1* | 9/2022 | Zhang | H04W 72/046 |
| 2023/0091216 A1* | 3/2023 | Yamamoto | H04L 1/08 370/329 |
| 2023/0171065 A1* | 6/2023 | Mei | H04L 5/0051 370/329 |
| 2023/0216711 A1* | 7/2023 | Yao | H04L 5/0051 370/328 |

* cited by examiner

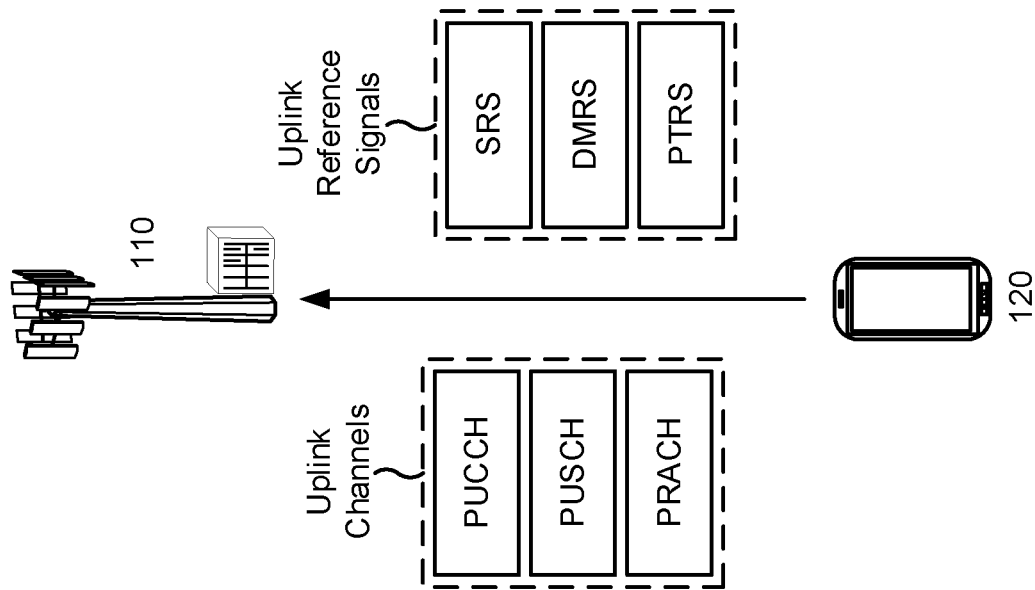
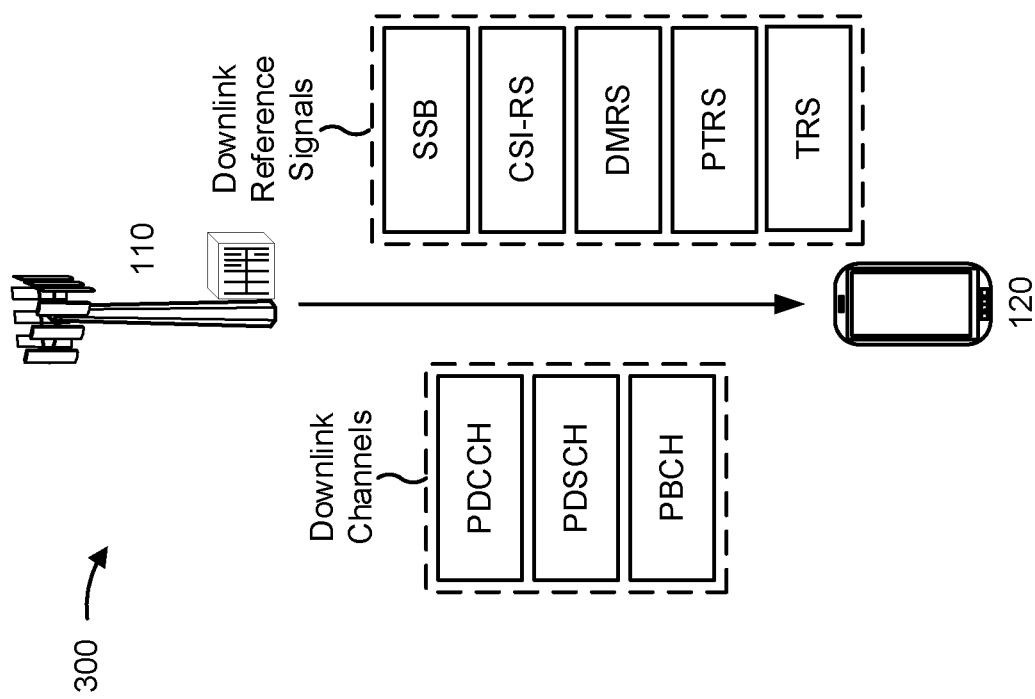
FIG. 3

TECHNIQUES FOR DEMODULATION REFERENCE SIGNAL BASED SIGNAL-TO-NOISE RATIO FOR DEMODULATION PROCESSING

CROSS-REFERENCE TO RELATED APPLICATIONS

This patent application claims priority to U.S. Provisional Patent Application No. 63/136,932, filed on Jan. 13, 2021, entitled "TECHNIQUES FOR DEMODULATION REFERENCE SIGNAL BASED SIGNAL-TO-NOISE RATIO FOR DEMODULATION PROCESSING," and assigned to the assignee hereof. This patent application also claims priority to U.S. Provisional Patent Application No. 63/172,827, filed on Apr. 9, 2021, entitled "TECHNIQUES FOR DEMODULATION REFERENCE SIGNAL BASED SIGNAL-TO-NOISE RATIO FOR DEMODULATION PROCESSING," and assigned to the assignee hereof. The disclosures of the prior applications are considered part of and are incorporated by reference into this patent application.

FIELD OF THE DISCLOSURE

Aspects of the present disclosure generally relate to wireless communication and to techniques and apparatuses for demodulation reference signal (DMRS) based signal-to-noise ratio (SNR) for demodulation processing.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes measuring a first energy level of a demodulation reference signal (DMRS); measuring a second energy level of at least one of a tracking reference signal (TRS) or a synchronization signal block (SSB); determining, based at least in part on the first energy level and the second energy level, a DMRS signal-to-noise ratio (SNR); performing, based at least in part on the DMRS SNR, channel estimation for a physical channel associated with a communication to determine an estimated channel; and performing, based at least in part on the estimated channel, demodulation processing for the communication.

In some aspects, a UE for wireless communication includes a memory and one or more processors coupled to the memory, the one or more processors configured to: measure a first energy level of a DMRS; measure a second energy level of at least one of a TRS or an SSB; determine, based at least in part on the first energy level and the second energy level, a DMRS SNR; perform, based at least in part on the DMRS SNR, channel estimation for a physical channel associated with a communication to determine an estimated channel; and perform, based at least in part on the estimated channel, demodulation processing for the communication.

In some aspects, a non-transitory computer-readable medium storing a set of instructions for wireless communication includes one or more instructions that, when executed by one or more processors of a UE, cause the UE to: measure a first energy level of a DMRS; measure a second energy level of at least one of a TRS or an SSB; determine, based at least in part on the first energy level and the second energy level, a DMRS SNR; perform, based at least in part on the DMRS SNR, channel estimation for a physical channel associated with a communication to determine an estimated channel; and perform, based at least in part on the estimated channel, demodulation processing for the communication.

In some aspects, an apparatus for wireless communication includes means for measuring a first energy level of a DMRS; means for measuring a second energy level of at least one of a TRS or an SSB; means for determining, based at least in part on the first energy level and the second energy level, a DMRS SNR; means for performing, based at least in part on the DMRS SNR, channel estimation for a physical channel associated with a communication to determine an estimated channel; and means for performing, based at least in part on the estimated channel, demodulation processing for the communication.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 3 is a diagram illustrating an example of physical channels and reference signals in a wireless network, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
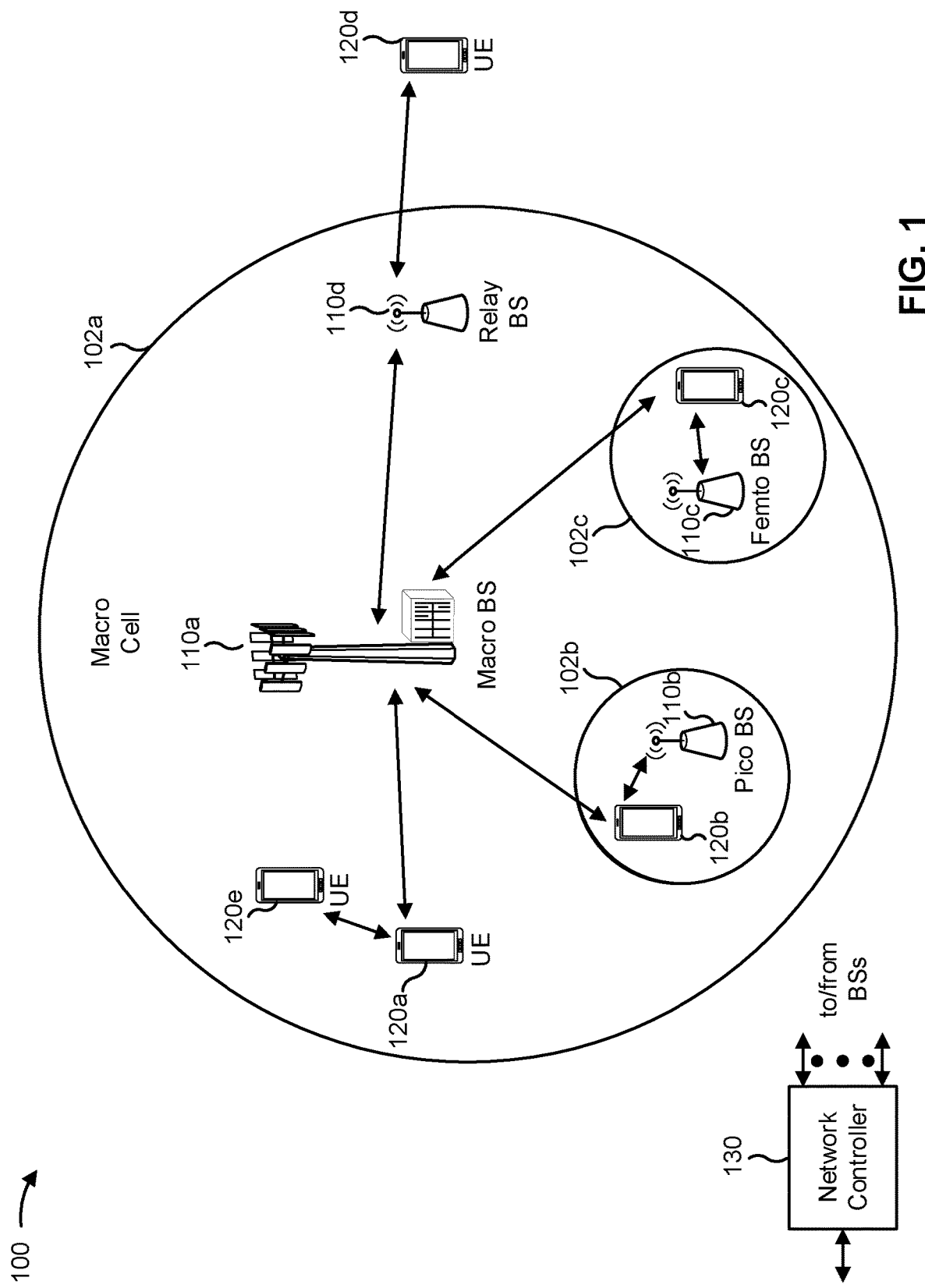
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a customer premises equipment. UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
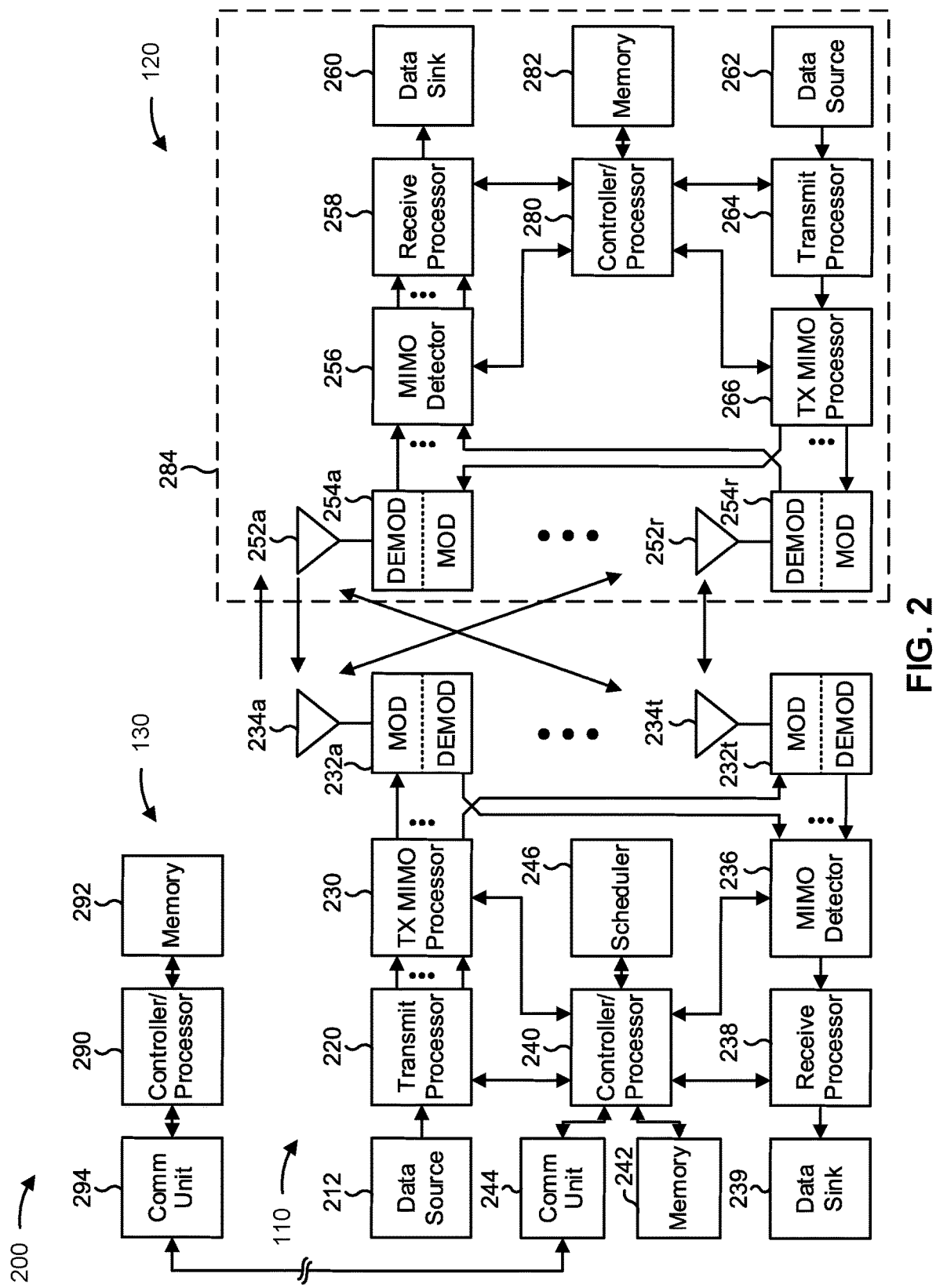
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs)

received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, an/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein.

Controller/processor 240 of base station 110, controller/processor 280 of UE 120, and/or any other component(s) of FIG. 2 may perform one or more techniques associated with DMRS-based signal-to-noise ratio (SNR) for demodulation processing, as described in more detail elsewhere herein. For example, controller/processor 240 of base station 110, controller/processor 280 of UE 120, and/or any other component(s) of FIG. 2 may perform or direct operations of, for example, process 600 of FIG. 6, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, and/or other processes as described herein. In some aspects, executing instructions may include running the instructions, converting the instructions, compiling the instructions, and/or interpreting the instructions.

In some aspects, the UE 120 includes means for measuring a first energy level of a DMRS; means for measuring a second energy level of at least one of a tracking reference signal (TRS) or a synchronization signal block (SSB); means for determining, based at least in part on the first energy level and the second energy level, a DMRS SNR; means for performing, based at least in part on the DMRS SNR, channel estimation for a physical channel associated with a communication to determine an estimated channel; and/or means for performing, based at least in part on the estimated channel, demodulation processing for the communication. The means for the UE 120 to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE 120 includes means for receiving, using a beam that is selected based at least in part on at least one of the TRS or the SSB, the communication on the physical channel.

In some aspects, the UE 120 includes means for measuring a reference signal SNR (RS-SNR) that is based at least in part on the second energy level.

In some aspects, the UE 120 includes means for determining the DMRS SNR for at least one of: a slot during which the communication is received, an antenna port used for receiving the communication, or a DMRS port associated with the DMRS.

In some aspects, the UE 120 includes means for measuring the DMRS SNR based at least in part on at least one of: the first energy level, the second energy level, a noise level associated with the DMRS, or a RS-SNR that is based at least in part on the second energy level.

In some aspects, the UE 120 includes means for measuring a noise level associated with the DMRS; and/or means for determining, based at least in part on the first energy level and the noise level, the DMRS SNR.

In some aspects, the UE 120 includes means for determining, based at least in part on the first energy level and the second energy level, a value; means for measuring an RS-SNR that is based at least in part on the second energy level; and/or means for modifying the RS-SNR by the value to obtain the DMRS SNR.

In some aspects, the UE 120 includes means for determining the value based at least in part on a function of the first energy level and the second energy level.

In some aspects, the UE 120 includes means for determining, based at least in part on the first energy level and a measured noise level associated with the DMRS, a first SNR; means for modifying an RS-SNR, that is based at least in part on the second energy level, by a first value to obtain a second SNR; means for determining whether a ratio, of the first SNR to the second SNR, satisfies a threshold; and/or means for determining that the DMRS SNR is the first SNR if the ratio of the first SNR to the second SNR satisfies the threshold, or the second SNR if the ratio of the first SNR to the second SNR does not satisfy the threshold.

In some aspects, the UE 120 includes means for determining, based at least in part on the first energy level and a measured noise level associated with the DMRS, a first SNR; means for modifying an RS-SNR, that is based at least in part on the second energy level, by a first value to obtain a second SNR; means for modifying the second SNR by a second value to obtain a third SNR; and/or means for determining that the DMRS SNR is the first SNR if the first SNR is greater than the third SNR, or the second SNR if the first SNR is less than or equal to the third SNR.

In some aspects, the UE 120 includes means for performing a delay spread estimation for the channel based at least in part on the DMRS SNR. In some aspects, the UE 120 includes means for measuring an RS-SNR that is based at least in part on the second energy level; means for comparing the RS-SNR to the DMRS SNR to obtain a difference between the RS-SNR and the DMRS SNR; and/or means for performing the delay spread estimation for the channel using the DMRS SNR based at least in part on the difference between the RS-SNR and the DMRS SNR satisfying a collision threshold.

In some aspects, the UE 120 includes means for performing, if the RS-SNR satisfies a reliability threshold, the delay spread estimation for the channel using the DMRS SNR to set a threshold value for separating a signal of the channel from noise over the estimated delay spread of the channel. In some aspects, the UE 120 includes means for determining, if the RS-SNR does not satisfy a reliability threshold, that the delay spread for the channel is a default value.

As indicated above, FIG. 2 is provided as an example. Other examples may differ from what is described with regard to FIG. 2.

FIG. 3 is a diagram illustrating an example 300 of physical channels and reference signals in a wireless network, in accordance with the present disclosure. As shown in FIG. 3, downlink channels and downlink reference signals may carry information from a base station 110 to a UE 120, and uplink channels and uplink reference signals may carry information from a UE 120 to a base station 110.

As shown, a downlink channel may include a physical downlink control channel (PDCCH) that carries downlink control information (DCI), a physical downlink shared channel (PDSCH) that carries downlink data, or a physical broadcast channel (PBCH) that carries system information, among other examples. In some aspects, PDSCH communications may be scheduled by PDCCH communications. As further shown, an uplink channel may include a physical uplink control channel (PUCCH) that carries uplink control information (UCI), a physical uplink shared channel (PUSCH) that carries uplink data, or a physical random access channel (PRACH) used for initial network access, among other examples. In some aspects, the UE 120 may transmit acknowledgement (ACK) or negative acknowledgement (NACK) feedback (e.g., ACK/NACK feedback or ACK/NACK information) in UCI on the PUCCH and/or the PUSCH.

As further shown, a downlink reference signal may include an SSB, a channel state information (CSI) reference signal (CSI-RS), a DMRS, a positioning reference signal (PRS), a phase tracking reference signal (PTRS), and/or a TRS, among other examples. As also shown, an uplink reference signal may include a sounding reference signal (SRS), a DMRS, and/or a PTRS, among other examples.

An SSB may carry information used for initial network acquisition and synchronization, such as a PSS, an SSS, a PBCH, and a PBCH DMRS. An SSB is sometimes referred to as a synchronization signal/PBCH (SS/PBCH) block. In some aspects, the base station 110 may transmit multiple SSBs on multiple corresponding beams, and the SSBs may be used for beam selection.

A CSI-RS may carry information used for downlink channel estimation (e.g., downlink CSI acquisition), which may be used for scheduling, link adaptation, or beam management, among other examples. The base station 110 may configure a set of CSI-RSs for the UE 120, and the UE 120 may measure the configured set of CSI-RSs. Based at least in part on the measurements, the UE 120 may perform channel estimation and may report channel estimation parameters to the base station 110 (e.g., in a CSI report), such as a CQI, a precoding matrix indicator (PMI), a CSI-RS resource indicator (CRI), a layer indicator (LI), a rank indicator (RI), or an RSRP, among other examples. The base station 110 may use the CSI report to select transmission parameters for downlink communications to the UE 120, such as a number of transmission layers (e.g., a rank), a precoding matrix (e.g., a precoder), an MCS, or a refined downlink beam (e.g., using a beam refinement procedure or a beam management procedure), among other examples.

A DMRS may carry information used to estimate a radio channel for demodulation of an associated physical channel (e.g., PDCCH, PDSCH, PBCH, PUCCH, or PUSCH). The design and mapping of a DMRS may be specific to a physical channel for which the DMRS is used for estimation. DMRSs are UE-specific, can be beamformed, can be confined in a scheduled resource (e.g., rather than transmitted on a wideband), and can be transmitted only when necessary. As shown, DMRSs are used for both downlink communications and uplink communications.

A PTRS may carry information used to compensate for oscillator phase noise. Typically, the phase noise increases as the oscillator carrier frequency increases. Thus, PTRS can be utilized at high carrier frequencies, such as millimeter wave frequencies, to mitigate phase noise. The PTRS may be used to track the phase of the local oscillator and to enable suppression of phase noise and common phase error (CPE). As shown, PTRSs are used for both downlink communications (e.g., on the PDSCH) and uplink communications (e.g., on the PUSCH).

A TRS may carry information used to assist in time domain and frequency domain tracking. The TRS may be used to track transmission path delay spread and/or Doppler spread. A TRS may be UE-specific. In some aspects, a TRS may be transmitted in a TRS burst. A TRS burst may consist of four OFDM symbols in two consecutive slots. In some aspects, a TRS may be associated with one or more CSI-RS configurations. For example, a TRS burst may use one or more CSI-RS resources.

A PRS may carry information used to enable timing or ranging measurements of the UE 120 based on signals transmitted by the base station 110 to improve observed time difference of arrival (OTDOA) positioning performance. For example, a PRS may be a pseudo-random Quadrature Phase Shift Keying (QPSK) sequence mapped in diagonal patterns with shifts in frequency and time to avoid collision with cell-specific reference signals and control channels (e.g., a PDCCH). In general, a PRS may be designed to improve detectability by the UE 120, which may need to detect downlink signals from multiple neighboring base stations in order to perform OTDOA-based positioning. Accordingly, the UE 120 may receive a PRS from multiple cells (e.g., a reference cell and one or more neighbor cells), and may report a reference signal time difference (RSTD) based on OTDOA measurements associated with the PRSs received from the multiple cells. In some aspects, the base station 110 may then calculate a position of the UE 120 based on the RSTD measurements reported by the UE 120.

An SRS may carry information used for uplink channel estimation, which may be used for scheduling, link adaptation, precoder selection, or beam management, among other examples. The base station 110 may configure one or more SRS resource sets for the UE 120, and the UE 120 may transmit SRSs on the configured SRS resource sets. An SRS resource set may have a configured usage, such as uplink CSI acquisition, downlink CSI acquisition for reciprocity-based operations, uplink beam management, among other examples. The base station 110 may measure the SRSs, may perform channel estimation based at least in part on the measurements, and may use the SRS measurements to configure communications with the UE 120.

As indicated above, FIG. 3 is provided as an example. Other examples may differ from what is described with regard to FIG. 3.

In some cases, for performing demodulation processing of a signal, SNR information for a physical channel associated with the signal may be required. For example, a UE may obtain an SNR to be used for channel estimation of the physical channel (e.g., to determine an estimated channel). The UE may use the estimated channel to perform demodulation processing of the signal to obtain data carried by the signal.

In some wireless communication systems, such as millimeter wave systems (and/or for wireless communication devices operating in FR2 or other frequency ranges), a UE may measure an SNR, for channel estimation to facilitate demodulation processing of a signal, using a TRS or an SSB. An SNR that is measured using a TRS or an SSB may be referred to herein as an RS-SNR. However, in some cases, a measured RS-SNR may provide an inaccurate estimation of a demodulation SNR (e.g., an SNR for the physical channel and/or for a channel for a DMRS). For example, the physical channel and/or the channel for the DMRS may experience a beamforming gain that is greater than a beamforming gain experienced by the TRS or the SSB (e.g., resulting in the RS-SNR providing an inaccurate estimation of a demodulation SNR). Because the signals (e.g., the DMRS, the TRS, and/or the SSB) may be beamformed signals, an energy level of the signals may vary depending on a beamforming gain experienced by the signals. As a result, an RS-SNR that is based on the TRS and/or the SSB may be different than the SNR of the DMRS (e.g., the DMRS channel) and/or the physical channel.

In some cases, a combination of a precoder and a beam used at a TRS port or an SSB port may introduce an imbalance (e.g., a difference) between the RS-SNR and the SNR of the DMRS. For example, the UE and a base station may select a beam (or a beam pair) for communications based at least in part on a measured beam parameter (e.g., RSRP and/or SNR) of the beam. The beam parameter may be measured using the TRS and/or the SSB and may indicate an average beam parameter across multiple antenna ports (e.g., of the UE). The UE and/or the base station may select a beam with a best beam parameter for communications. However, in some cases, the selected beam may cause an imbalance between the RS-SNR (e.g., measured at a TRS port or an SSB port) and the SNR of the DMRS due to different channel conditions across antenna ports of the UE. For example, due to a movement or change in orientation of the UE (and/or of an antenna of the UE), the selected beam may cause an RS-SNR (e.g., measured by the UE at a TRS port or an SSB port) to provide an inaccurate estimation of a demodulation SNR for a physical channel and/or a DMRS channel.

In some cases, a TRS or an SSB may experience a collision with another signal, causing interference for the TRS or the SSB. As a result, the interference experienced by the TRS or the SSB may be different than interference experienced by the physical channel and/or the DMRS channel. For example, neighboring cells may configure TRSs and/or SSBs to use the same or similar frequencies. Therefore, the TRS or the SSB may collide with a TRS or an SSB transmitted from a neighboring cell, resulting in interference that may not be experience by the physical channel and/or the DMRS channel. Therefore, an RS-SNR measured by the UE may provide inaccurate estimation of a demodulation SNR for a physical channel and/or a DMRS channel. By using an RS-SNR that provides an inaccurate estimation of a demodulation SNR for a physical channel and/or a DMRS channel, the UE may perform an inaccurate channel estimation (e.g., resulting in an inaccurate estimated channel). Using an inaccurate estimated channel for demodulation processing results in decreased demodulation performance. As a result, the UE may experience throughput degradation and/or a decreased spectral efficiency for signals that are demodulated using the inaccurate estimated channel.

Some techniques and apparatuses described herein enable DMRS based SNR for demodulation processing. For example, a UE may measure an SNR of a received DMRS (e.g., based at least in part on an energy level of the DMRS and a noise level of the DMRS). The UE may use the SNR of the DMRS to perform channel estimation of a physical channel (e.g., to obtain an estimated channel). The UE may perform demodulation processing of a signal based at least in part on the estimated channel. By using an SNR that is measured directly from a DMRS, a UE may ensure that the SNR used for channel estimation to facilitate demodulation processing is an accurate estimation of the SNR experienced by the physical channel and/or the DMRS channel.

In some cases, an SNR measured directly from a DMRS (e.g., only from a DMRS) may provide an unreliable measurement. For example, as a DMRS may be confined in a scheduled resource (e.g., rather than transmitted on a wideband) and/or transmitted only when necessary, the SNR measured directly from a DMRS may not be accurate due to a lack of filtering. Therefore, in some cases, the UE may determine a DMRS SNR (e.g., an SNR to be used for channel estimation to facilitate demodulation processing) based at least in part on an energy level of the DMRS and an energy level of a TRS and/or SSB. For example, the UE may measure an RS-SNR (e.g., using a TRS or SSB) and a reference signal (RS) energy level (e.g., based at least in part on the TRS or SSB). The UE may determine the DMRS SNR based at least in part on the energy level of the DMRS and a noise level of the DMRS in a slot in which a signal is received and/or based at least in part on an RS-SNR and an RS energy level (e.g., of a TRS or an SSB). Therefore, in scenarios in which the SNR measured directly from a DMRS (e.g., only from a DMRS) may provide an unreliable measurement, the UE may use a modified or biased RS-SNR (e.g., that is based at least in part on a ratio of the energy level of the DMRS to the RS energy level) to account for the issues described above that result from using the unmodified RS-SNR. As a result, the UE may ensure that an accurate channel estimation is performed to facilitate demodulation processing. Using an accurate channel estimation improves demodulation performance, improves throughput experienced by the UE, and/or improves spectral efficiency experienced by the UE, among other examples.

Figure 4:
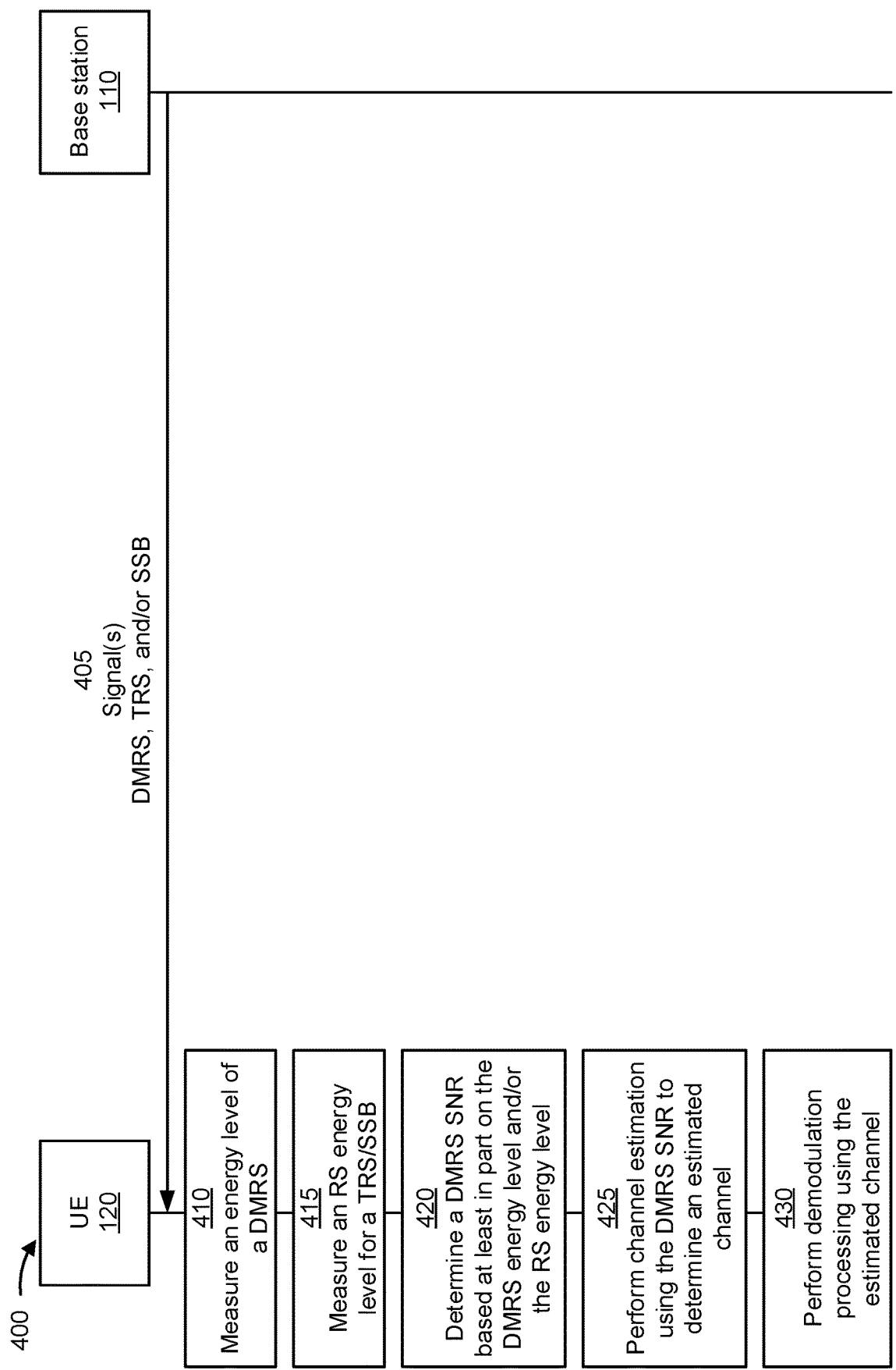
FIGS. 4 and 5 are diagrams illustrating examples associated with demodulation reference signal (DMRS) based signal-to-noise ratio (SNR) for demodulation processing, in accordance with the present disclosure.

FIG. 4 is a diagram illustrating an example 400 associated with DMRS based SNR for demodulation processing, in accordance with the present disclosure. As shown in FIG. 4, example 400 includes communication between UE 120 and a base station 110. In some aspects, example 400 may include communication between a first wireless communication device (e.g., a UE 120, a base station 110, and/or a wireless node) and a second wireless communication device. In some aspects, the UE 120 and the base station 110 may be included in a wireless network, such as wireless network 100. In some aspects, the wireless network may be a millimeter wave wireless network. For example, the UE 120 and the base station 110 may operate in a millimeter wave operating frequency (and/or in FR2). The UE 120 and the base station 110 may communicate via a wireless access link, which may include an uplink and a downlink.

As shown by reference number 405, the UE 120 may receive, from the base station 110, one or more signals. For example, the base station 110 may transmit a communication to the UE 120 (e.g., that is to be decoded and demodulated by the UE 120). The base station 110 may transmit one or more reference signals to the UE 120. For example, the base station 110 may transmit one or more DMRSs to the UE 120. Additionally, the base station 110 may transmit, to the UE 120, one or more TRSs and/or one or more SSBs.

In some aspects, the UE 120 and the base station 110 may communicate using a beam that is selected based at least in part on a measurement of a beam parameter (e.g., RSRP or SNR). The UE 120 (or the base station 110) may measure a TRS and/or an SSB to identify a value of the beam parameter. The value of the beam parameter may be an average value across multiple (or all) antenna ports of the UE 120 (or the base station 110). The UE 120 (or the base station 110) may report beam parameter values for multiple beams. The UE 120 and/or the base station 110 may select a beam for communications based at least in part on the report of beam parameters (e.g., a beam with a best or highest beam parameter may be selected for communications between the UE 120 and the base station 110).

As described above, the UE 120 may perform demodulation processing of a signal using an estimated channel of a physical channel used to transmit the signal. For example, as described in more detail below, the UE 120 may perform minimized mean square error (MMSE) channel estimation to determine the estimated channel. SNR information for the physical channel may be needed as an input to perform the channel estimation (e.g., the MMSE channel estimation). As described in more detail below, the UE 120 may obtain the SNR information (e.g., an estimated SNR of the physical channel) based at least in part on a DMRS received by the UE 120.

As shown by reference number 410, the UE 120 may measure or identify an energy level of a DMRS received by the UE 120. The energy level may be a measure of a signal level of the DMRS and a noise level associated with the DMRS (e.g., the energy level may be a total received energy level, of signal plus noise, of the DMRS). The energy level may be an average energy level across one or more taps or tones of the DMRS (e.g., based at least in part on the scheduled resources for the DMRS). In some aspects, the UE 120 may measure or identify the noise level of the DMRS. The UE 120 may measure or identify the energy level and/or the noise level of the DMRS using a port (e.g., a DMRS port) and a beam or channel associated with the DMRS. The UE 120 may measure or identify the energy level and/or the noise level of the DMRS for a slot (e.g., per slot) in which the DMRS or communication to be demodulated is received, for a receive antenna port of the UE 120

(e.g., per receive antenna port), and/or for a DMRS port used to receive the DMRS (e.g., per DMRS port).

As shown by reference number 415, the UE 120 may measure or identify an energy level of at least one of a TRS or an SSB. The energy level of the reference signal (e.g., the TRS or the SSB) may be a measure of a signal level of the reference signal and a noise level associated with the reference signal (e.g., the energy level may be a total received energy level, of signal plus noise, of the reference signal). In some aspects, the UE 120 may measure or identify the noise level of the reference signal (e.g., the TRS or the SSB). In some aspects, the UE 120 may measure or identify an RS-SNR of the reference signal (e.g., the TRS or the SSB) based at least in part on the energy level of the reference signal and the noise level of the reference signal. The UE 120 may measure or identify the reference signal energy level and/or the noise level of the reference signal using a port (e.g., a TRS port or an SSB port) and a beam or channel associated with the reference signal.

As shown by reference number 420, the UE 120 may determine a DMRS SNR (e.g., an SNR to be used by the UE 120 for channel estimation to facilitate demodulation processing) based at least in part on the energy level of the DMRS and/or the energy level of the reference signal (e.g., the TRS or the SSB). The UE 120 may determine the DMRS SNR based at least in part on the energy level of the DMRS, the energy level of the reference signal (e.g., the TRS or the SSB), a noise level of the DMRS, and/or the RS-SNR of the reference signal (e.g., the TRS or the SSB), among other examples.

In some aspects, the UE 120 may determine the DMRS SNR using only the energy level of the DMRS and the noise level of the DMRS. For example, the DMRS SNR may be determined according to the equation of $$\frac{EE_{DMRS}}{NE_{DMRS}} - 1,$$

where $EE_{DMRS}$ is the energy level of the DMRS and $NE_{DMRS}$ is the noise level of the DMRS. By determining the DMRS SNR using only the energy level of the DMRS and the noise level of the DMRS, the UE 120 may be enabled to compensate for an imbalance in the energy level of the reference signal (e.g., of the TRS or SSB) compared to an energy level of the DMRS (e.g., of the DMRS channel). As a result, the UE 120 may be enabled to perform a more accurate channel estimation for a demodulation channel.

In some aspects, the UE 120 may determine the DMRS SNR based at least in part on modifying or scaling the RS-SNR of the reference signal (e.g., the TRS or the SSB). For example, the UE 120 may determine a value or a ratio based at least in part on the energy level of the DMRS and the energy level of the reference signal (e.g., the TRS or the SSB). For example, the value or the ratio may be determined based at least in part on a function of (e.g., a ratio of and/or a difference between) the energy level of the DMRS and the energy level of the reference signal (e.g., the TRS or the SSB). The value or the ratio may indicate a beamforming gain ratio between the DMRS and the reference signal (e.g., the TRS or the SSB). That is, the value or the ratio may indicate a received energy of the DMRS compared to a received energy of the reference signal (e.g., the TRS or the SSB). The UE 120 may determine the DMRS SNR by modifying or scaling the RS-SNR (e.g., of the TRS or SSB) by the value or the ratio. For example, the UE 120 may determine the DMRS SNR according to the equation $$\frac{EE_{DMRS}}{EE_{RS}} \cdot SNR_{RS},$$

where $EE_{DMRS}$ is the energy level of the DMRS, $EE_{RS}$ is the energy level of the reference signal (e.g., the TRS or the SSB), and $SNR_{RS}$ is the RS-SNR of the reference signal (e.g., the TRS or the SSB). In some aspects, the UE 120 may determine the DMRS SNR by further modifying or scaling the modified or scaled RS-SNR. For example, the UE 120 may determine the DMRS SNR according to the equation $$\frac{EE_{DMRS}}{EE_{RS}} \cdot SNR_{RS} \cdot N,$$

where N is a scaling value. By modifying or scaling the RS-SNR (e.g., of the TRS or SSB) by the value or the ratio, the UE 120 may be enabled to compensate for an imbalance in the energy level of the reference signal (e.g., of the TRS or SSB) compared to an energy level of the DMRS. As a result, the UE 120 may be enabled to perform a more accurate channel estimation for a demodulation channel.

In some aspects, the UE 120 may determine whether the DMRS SNR determined or computed using only the energy level of the DMRS and the noise level of the DMRS provides a sufficient reliability. For example, as described above, the DMRS may be confined to the scheduled resources. As a result, in some cases, the UE 120 may have insufficient resources to measure the energy level of the DMRS and the noise level of the DMRS to provide a reliable estimation for the DMRS SNR. In some aspects, the UE 120 may determine whether the DMRS SNR determined or computed using only the energy level of the DMRS and the noise level of the DMRS provides a sufficient reliability based at least in part on the energy level of the DMRS, the energy level of the reference signal (e.g., the TRS or the SSB), and/or the RS-SNR of the reference signal (e.g., the TRS or the SSB), among other examples.

For example, the UE 120 may use the modified or scaled RS-SNR (e.g., as described above) to determine whether to use the DMRS SNR determined or computed using only the energy level of the DMRS and the noise level of the DMRS. In some aspects, the UE 120 may determine whether a ratio of a first SNR (e.g., the DMRS SNR determined or computed using only the energy level of the DMRS and the noise level of the DMRS) to the modified or scaled RS-SNR (e.g., described above) satisfies (e.g., is greater than) a threshold. For example, the UE 120 may use the equation $$\frac{\left(\frac{EE_{DMRS}}{NE_{DMRS}} - 1\right)}{\frac{EE_{DMRS}}{EE_{RS}} \cdot SNR_{RS}} > \text{threshold, where } \left(\frac{EE_{DMRS}}{NE_{DMRS}} - 1\right)$$

is the DMRS SNR determined or computed using only the energy level of the DMRS and the noise level of the DMRS, and $$\frac{EE_{DMRS}}{EE_{RS}} \cdot SNR_{RS}$$

is the modified or scaled RS-SNR, to determine whether to use the DMRS SNR determined or computed using only the energy level of the DMRS and the noise level of the DMRS. For example, if the ratio of the first SNR (e.g., the DMRS SNR determined or computed using only the energy level of the DMRS and the noise level of the DMRS) to the modified or scaled RS-SNR satisfies the threshold, then the UE 120 may use the first SNR as the DMRS SNR. If the ratio of the first SNR to the modified or scaled RS-SNR does not satisfy the threshold, then the UE 120 may use the modified or scaled RS-SNR as the DMRS SNR.

In some aspects, the UE 120 may determine whether to use the first SNR (e.g., the DMRS SNR determined or computed using only the energy level of the DMRS and the noise level of the DMRS) based at least in part on whether the first SNR is greater than the modified or scaled RS-SNR. In some aspects, the UE 120 may determine whether to use the first SNR based at least in part on whether the first SNR is greater than the modified or scaled RS-SNR that is modified by a threshold value (e.g., the same value as the threshold described above or a different value). For example, the UE 120 may use the equation $$\left(\frac{EE_{DMRS}}{NE_{DMRS}} - 1\right) > \text{threshold} \cdot \frac{EE_{DMRS}}{EE_{RS}} \cdot SNR_{RS},$$

$$\text{where } \left(\frac{EE_{DMRS}}{NE_{DMRS}} - 1\right)$$

is the first SNR (e.g., the DMRS SNR determined or computed using only the energy level of the DMRS and the noise level of the DMRS), and $$\frac{EE_{DMRS}}{EE_{RS}} \cdot SNR_{RS}$$

is the modified or scaled RS-SNR, to determine whether to use the first SNR as the DMRS SNR. If the first SNR is greater than the modified or scaled RS-SNR that is modified by the threshold value, then the UE 120 may use the first SNR as the DMRS SNR. If the first SNR is less than or equal to the modified or scaled RS-SNR that is modified by the threshold value, then the UE 120 may use the modified or scaled RS-SNR as the DMRS SNR.

In some aspects, a value of the threshold may be a fixed value (e.g., 3 decibels or a similar value) for all UEs. In some aspects, a value of the threshold may be specific to the UE 120. In some aspects, a value of the threshold may be variable and change over time. For example, a value of the threshold may be based at least in part on channel conditions experienced by the UE 120.

As shown by reference number 425, the UE 120 may perform channel estimation using the DMRS SNR (e.g., determined by the UE 120 as described above) to determine an estimated channel of a physical channel associated with a signal. For example, the UE 120 may use the DMRS SNR to determine an MMSE filter coefficient. The UE 120 may use the MMSE filter coefficient to determine an estimated channel for a physical channel associated with a signal.

In some aspects, the UE 120 may perform channel estimation to estimate a delay spread for the channel using the DMRS SNR (e.g., determined by the UE 120 as described above). For example, a multi-path channel may experience a delay spread due to delays at multiple paths (e.g., due to multi-path propagation). The UE 120 may perform delay spread estimation for the channel based at least in part on the DMRS SNR to improve the delay spread estimation when an SNR of a TRS or an SSB is low or unreliable.

For example, when there is an imbalance between the RS-SNR and the DMRS SNR, the UE 120 may use the DMRS SNR to improve or enhance the delay spread estimation. Typically, the UE 120 may relay on the RS-SNR (e.g., an SNR of a TRS or an SSB) to perform channel estimation. However, when the TRS or the SSB experiences interference or other differing parameters from the physical channel (e.g., as described above), delay spread estimations based on the SNR of a TRS or an SSB may be unreliable or result in an underestimation of the delay spread. For example, the UE 120 may detect that the TRS or the SSB is experiencing differing parameters from the physical channel (e.g., that the TRS or the SSB is experiencing a collision with another signal) based at least in part on a difference between the DMRS SNR and the RS-SNR. For example, if the difference between the DMRS SNR and the RS-SNR satisfies (e.g., is greater than or equal to) a collision threshold (e.g., 7 dB or similar values), then the UE 120 may determine or detect that that the TRS or the SSB is experiencing differing parameters from the physical channel (e.g., that the TRS or the SSB is experiencing a collision with another signal). Based at least in part on the difference between the DMRS SNR and the RS-SNR satisfying the collision threshold, the UE 120 may perform the delay spread estimation for the channel using the DMRS SNR.

In some aspects, the UE 120 may determine whether the RS-SNR (e.g., an SNR of a TRS or an SSB) satisfies a reliability threshold (e.g., 3 dB or similar values). If the RS-SNR satisfies the reliability threshold, then the UE 120 may use the RS-SNR to calculate the delay spread estimation and may use the DMRS SNR to set a threshold value (e.g., a delay spread threshold value) for separating a signal of the channel from noise over the estimated delay spread of the channel. For example, the UE 120 may use the threshold value to set a range from a strongest path (e.g., a dominant path associated with a highest power among paths received by the UE 120) to ensure that all of the most significant paths of the channel are identified or included in the range. For example, the threshold value may be a value that the UE 120 uses to capture paths that have an energy that is within the value from the energy of the strongest or dominant path received by the UE 120. Therefore, using the DMRS SNR to set the threshold value (e.g., when the RS-SNR is unreliable as described above) improves the channel estimation by ensuring that the threshold value is set such that all (or a majority of) the most significant paths of the channel are identified by the UE 120 (e.g., by ensuring that energy of the most significant paths is within the threshold value from the energy of the best or dominant path). In other words, using the DMRS SNR to set the threshold value improves channel estimation by ensuring that the most significant paths of the channel are captured by the UE 120.

In some aspects, the UE 120 may determine that the RS-SNR does not satisfy (e.g., is less than) the reliability threshold. Therefore, the RS-SNR may not be reliable enough or robust enough to use to estimate the channel delay spread. In other words, using the RS-SNR to compute the delay spread of the channel when the RS-SNR does not satisfy (e.g., is less than) the reliability threshold may result in delay spread underestimation that causes performance loss on fading channels. Therefore, if the RS-SNR does not satisfy the reliability threshold, the UE 120 may determine that the delay spread for the channel is a default value. For example, based at least in part on the difference between the DMRS SNR and the RS-SNR satisfying the collision threshold and based at least in part on the RS-SNR not satisfying the reliability threshold, the UE 120 may use a default value (e.g., a default delay spread value for the channel stored by the UE 120 or indicated to the UE 120) for the delay spread when performing channel estimation.

As a result, using the DMRS SNR to perform channel delay spread estimation may result in improved or enhanced channel estimation (e.g., compared to using only an RS-SNR for performing the channel delay spread estimation). For example, the UE 120 may be enabled to identify or detect when the TRS or the SSB is experiencing differing parameters from the physical channel (e.g., that the TRS or the SSB is experiencing a collision with another signal) based at least in part on a difference between the DMRS SNR and the RS-SNR. As a result, the UE 120 may use the DMRS SNR to improve the channel delay spread estimation, as described above.

As shown by reference number 430, the UE 120 may perform demodulation processing of the signal using the estimated channel. For example, the UE 120 may use the estimated channel to perform demodulation processing of a signal to obtain data carried by the signal. The UE 120 may communicate (e.g., transmit or receive) one or more signals with the base station 110 based at least in part on performing demodulation processing of the signal using the estimated channel as described herein. As described above, by using the DMRS SNR described above, the UE 120 may ensure that an accurate channel estimation is performed to facilitate demodulation processing. Using an accurate channel estimation improves demodulation performance, improves throughput experienced by the UE 120, and/or improves spectral efficiency experienced by the UE 120, among other examples.

As indicated above, FIG. 4 is provided as an example. Other examples may differ from what is described with respect to FIG. 4.

Figure 5:
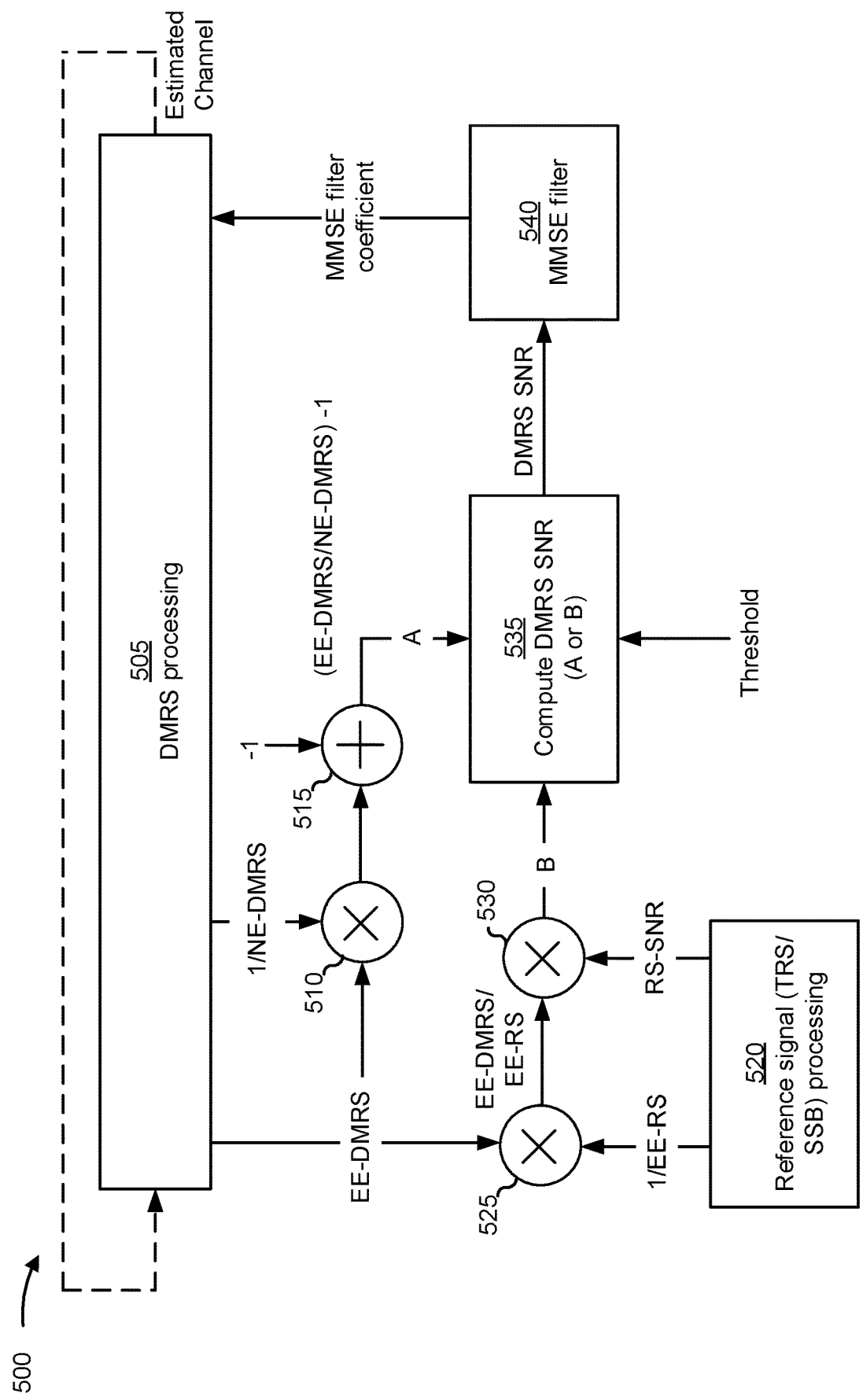

FIG. 5 is a diagram illustrating an example 500 associated with DMRS based SNR for demodulation processing, in accordance with the present disclosure. As shown in FIG. 5, example 500 depicts an example demodulation processing flow for a UE.

As shown by reference number 505, the UE may perform demodulation processing (e.g., DMRS processing) of signals, using an estimated channel, to obtain data carried by the signal. As shown by reference number 510, the UE may measure or identify, based at least in part on the DMRS processing, an energy level of a received DMRS (shown as EE-DMRS in FIG. 5) and a noise level of a received DMRS (e.g., shown as NE-DMRS in FIG. 5). The UE may combine (e.g., at a mixer shown by reference number 510) the energy level of the received DMRS and the noise level of the received DMRS. As shown by reference number 515, the UE may subtract 1 from the combined energy level of the received DMRS and the noise level of the received DMRS to identify a first SNR that is based only on the received DMRS $$\left(\text{e.g., } \frac{\text{EE\_DMRS}}{\text{NE\_DMRS}} - 1\right).$$

As shown by reference number 520, the UE may perform reference signal processing of one or more received reference signals (e.g., TRSs or SSBs). Based at least in part on performing the reference signal processing, the UE may measure or identify an energy level of the reference signal (e.g., shown as EE-RS in FIG. 5) and an RS-SNR of the reference signal. As shown by reference number 525, the UE may combine the energy level of the DMRS and the energy level of the reference signal (e.g., at the mixer shown by reference number 525) to identify a value or a ratio $$\left(\text{e.g., } \frac{\text{EE\_DMRS}}{\text{EE\_RS}}\right).$$

As described above in connection with FIG. 4, the value or the ratio may indicate a beamforming gain of the DMRS compared to a beamforming gain of the reference signal (e.g., a ratio of, or a difference between, the beamforming gain of the DMRS and the beamforming gain of the reference signal). As shown by reference number 530, the UE may modify the RS-SNR of the reference signal by the value or the ratio to determine a second SNR $$\left(\text{e.g., } \frac{\text{EE\_DMRS}}{\text{EE\_RS}} \cdot SNR_{RS}\right).$$

As shown by reference number 535, the UE may determine or compute a DMRS SNR (e.g., the SNR to be used by the UE for channel estimation to facilitate demodulation processing) based at least in part on the first SNR (shown as A in FIG. 5) and the second SNR (shown as B in FIG. 5). As described above in connection with FIG. 4, in some aspects, the UE may use the first SNR as the DMRS SNR. Alternatively, the UE may use the second SNR as the DMRS SNR.

For example, in some aspects, the UE may determine whether to use the first SNR or the second SNR as the DMRS SNR. As described above in connection with FIG. 4, the UE may use a threshold value to compare the first SNR and the second SNR to determine whether to use the first SNR or the second SNR as the DMRS SNR. For example, the UE may determine whether a ratio of the first SNR to the second SNR (e.g., the first SNR divided by the second SNR) satisfies the threshold. If the ratio of the first SNR to the second SNR satisfies the threshold, then the UE may use the first SNR as the DMRS SNR. If the ratio of the first SNR to the second SNR does not satisfy the threshold, then the UE may use the second SNR as the DMRS SNR.

In some aspects, the UE may modify the second SNR by a value of the threshold. The UE may determine whether the first SNR is greater than the modified second SNR. If the first SNR is greater than the modified second SNR, then the UE may use the first SNR as the DMRS SNR. If the first SNR is less than or equal to the modified second SNR, then the UE may use the second SNR as the DMRS SNR.

As shown by reference number 540, the UE may provide the determined DMRS SNR to an MMSE filter. The UE, using the MMSE filter, may determine an MMSE filter coefficient based at least in part on the DMRS SNR. The UE may provide the MMSE filter coefficient to a demodulation processing component (e.g., a DMRS processing component). The UE may use the MMSE filter coefficient for channel estimation of a physical channel. For example, the UE may perform a channel estimation based at least in part on the DMRS SNR (e.g., using the MMSE filter coefficient) to determine an estimated channel of the physical channel. The UE may perform demodulation of a signal, using the estimated channel, to obtain data carried by the signal. As described above, by determining or identifying the DMRS SNR as described above, the UE may obtain a more accurate channel estimation to facilitate demodulation processing. As a result, demodulation performance of the UE is improved.

As indicated above, FIG. 5 is provided as an example. Other examples may differ from what is described with respect to FIG. 5.

Figure 6:
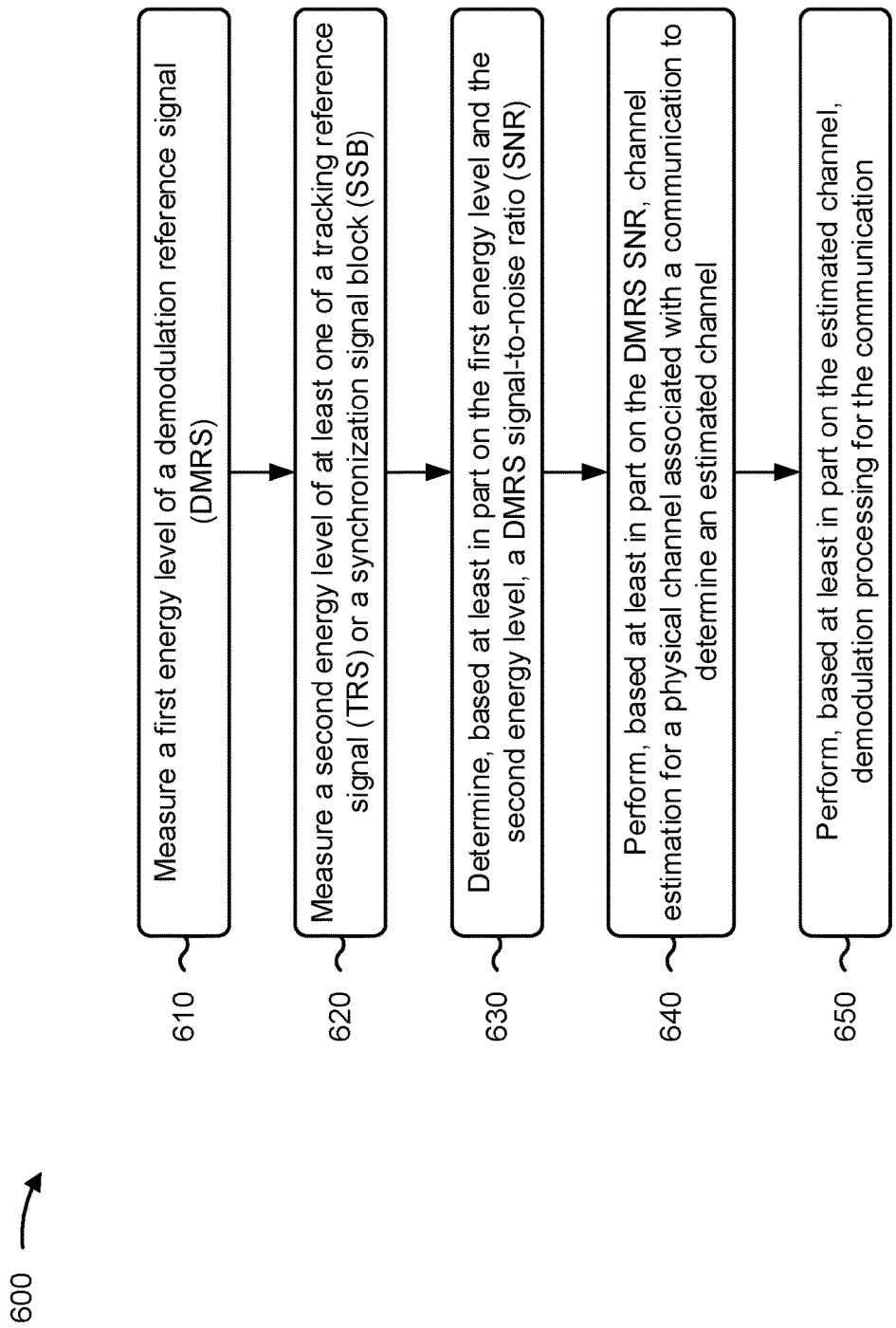
FIG. 6 is a diagram illustrating an example process associated with DMRS based SNR for demodulation processing, in accordance with the present disclosure.

FIG. 6 is a diagram illustrating an example process 600 performed, for example, by a UE, in accordance with the present disclosure. Example process 600 is an example where the UE (e.g., UE 120) performs operations associated with DMRS based SNR for demodulation processing.

As shown in FIG. 6, in some aspects, process 600 may include measuring a first energy level of a DMRS (block 610). For example, the UE (e.g., using measurement component 708, depicted in FIG. 7) may measure a first energy level of a DMRS, as described above.

As further shown in FIG. 6, in some aspects, process 600 may include measuring a second energy level of at least one of a TRS or an SSB (block 620). For example, the UE (e.g., using measurement component 708, depicted in FIG. 7) may measure a second energy level of at least one of a TRS or an SSB, as described above.

As further shown in FIG. 6, in some aspects, process 600 may include determining, based at least in part on the first energy level and the second energy level, a DMRS SNR (block 630). For example, the UE (e.g., using determination component 710, depicted in FIG. 7) may determine, based at least in part on the first energy level and the second energy level, a DMRS SNR, as described above.

As further shown in FIG. 6, in some aspects, process 600 may include performing, based at least in part on the DMRS SNR, channel estimation for a physical channel associated with a communication to determine an estimated channel (block 640). For example, the UE (e.g., using channel estimation component 712, depicted in FIG. 7) may perform, based at least in part on the DMRS SNR, channel estimation for a physical channel associated with a communication to determine an estimated channel, as described above.

As further shown in FIG. 6, in some aspects, process 600 may include performing, based at least in part on the estimated channel, demodulation processing for the communication (block 650). For example, the UE (e.g., using demodulation component 714, depicted in FIG. 7) may perform, based at least in part on the estimated channel, demodulation processing for the communication, as described above.

Process 600 may include additional aspects, such as any single aspect or any combination of aspects described below and/or in connection with one or more other processes described elsewhere herein.

In a first aspect, process 600 includes receiving, using a beam that is selected based at least in part on at least one of the TRS or the SSB, the communication on the physical channel.

In a second aspect, alone or in combination with the first aspect, process 600 includes measuring an RS-SNR that is based at least in part on the second energy level.

In a third aspect, alone or in combination with one or more of the first and second aspects, the determination of the DMRS SNR includes determining the DMRS SNR for at least one of a slot during which the communication is received, an antenna port used for receiving the communication, or a DMRS port associated with the DMRS.

In a fourth aspect, alone or in combination with one or more of the first through third aspects, the determination of the DMRS SNR includes measuring the DMRS SNR based at least in part on at least one of the first energy level, the second energy level, a noise level associated with the DMRS, or an RS-SNR that is based at least in part on the second energy level.

In a fifth aspect, alone or in combination with one or more of the first through fourth aspects, the determination of the DMRS SNR includes measuring a noise level associated with the DMRS, and determining, based at least in part on the first energy level and the noise level, the DMRS SNR.

In a sixth aspect, alone or in combination with one or more of the first through fifth aspects, the determination of the DMRS SNR includes determining, based at least in part on the first energy level and the second energy level, a value, measuring an RS-SNR that is based at least in part on the second energy level, and modifying the RS-SNR by the value to obtain the DMRS SNR.

In a seventh aspect, alone or in combination with one or more of the first through sixth aspects, the determination of the value includes determining the value based at least in part on a function of the first energy level and the second energy level.

In an eighth aspect, alone or in combination with one or more of the first through seventh aspects, the determination of the DMRS SNR includes determining, based at least in part on the first energy level and a measured noise level associated with the DMRS, a first SNR, modifying an RS-SNR, that is based at least in part on the second energy level, by a first value to obtain a second SNR, determining whether a ratio, of the first SNR to the second SNR, satisfies a threshold, and determining that the DMRS SNR is the first SNR if the ratio of the first SNR to the second SNR satisfies the threshold, or the second SNR if the ratio of the first SNR to the second SNR does not satisfy the threshold.

In a ninth aspect, alone or in combination with one or more of the first through eighth aspects, the determination of the DMRS SNR includes determining, based at least in part on the first energy level and a measured noise level associated with the DMRS, a first SNR, modifying an RS-SNR, that is based at least in part on the second energy level, by a first value to obtain a second SNR, modifying the second SNR by a second value to obtain a third SNR, and determining that the DMRS SNR is the first SNR if the first SNR is greater than the third SNR, or the second SNR if the first SNR is less than or equal to the third SNR.

In a tenth aspect, alone or in combination with one or more of the first through ninth aspects, the UE is operating in a millimeter wave operating frequency.

In an eleventh aspect, alone or in combination with one or more of the first through tenth aspects, performing the channel estimation includes performing a delay spread estimation for the channel based at least in part on the DMRS SNR.

In a twelfth aspect, alone or in combination with one or more of the first through eleventh aspects, performing the delay spread estimation includes measuring an RS-SNR that is based at least in part on the second energy level; comparing the RS-SNR to the DMRS SNR to obtain a difference between the RS-SNR and the DMRS SNR; and performing the delay spread estimation for the channel using the DMRS SNR based at least in part on the difference between the RS-SNR and the DMRS SNR satisfying a collision threshold.

In a thirteenth aspect, alone or in combination with one or more of the first through twelfth aspects, performing the delay spread estimation for the channel using the DMRS SNR includes performing, if the RS-SNR satisfies a reliability threshold, the delay spread estimation for the channel using the DMRS SNR to set a threshold value for separating a signal of the channel from noise over the estimated delay spread of the channel.

In a fourteenth aspect, alone or in combination with one or more of the first through thirteenth aspects, performing the delay spread estimation for the channel using the DMRS SNR includes determining, if the RS-SNR does not satisfy a reliability threshold, that the delay spread for the channel is a default value.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
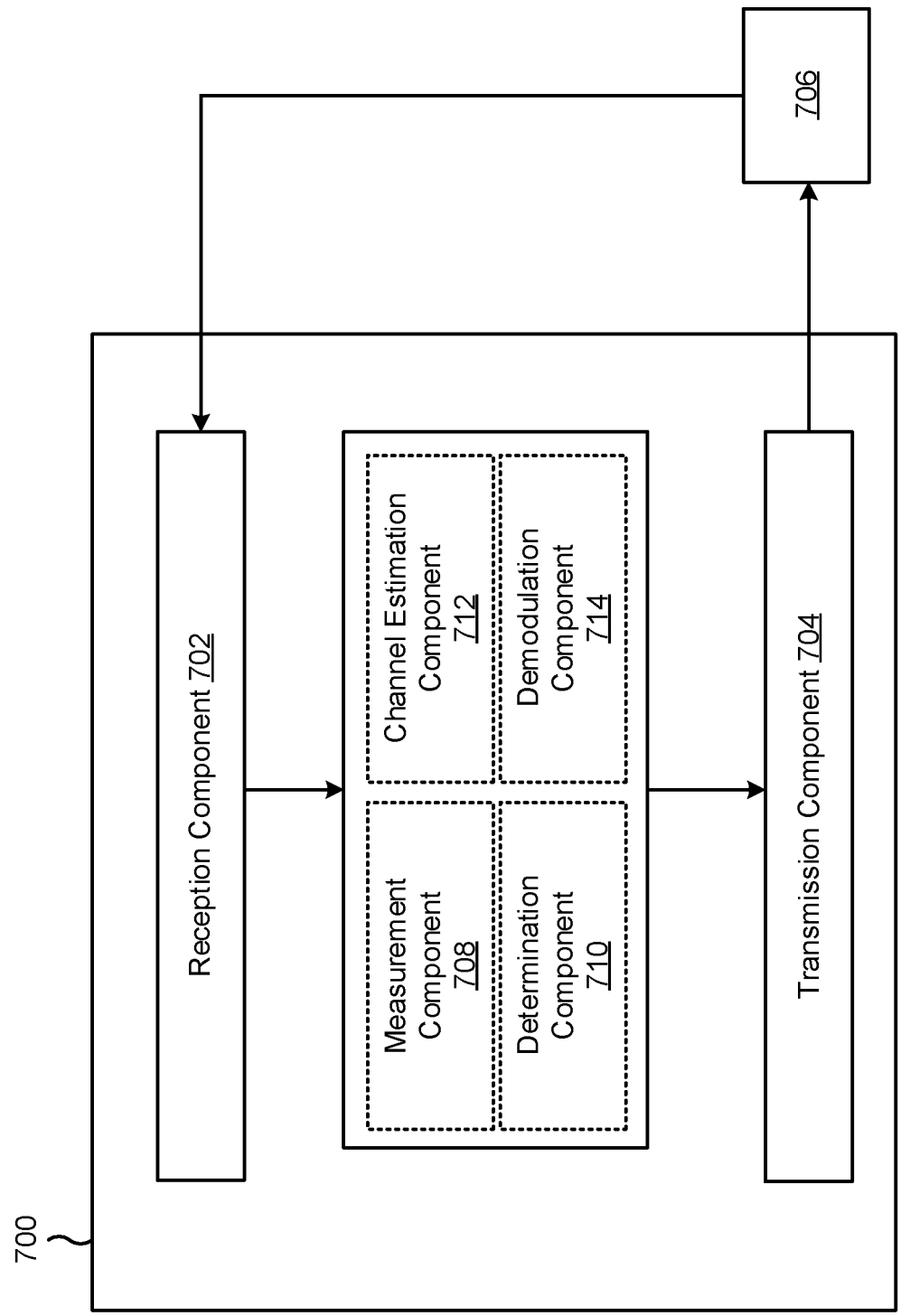
FIGS. 7 and 8 are block diagrams of example apparatuses for wireless communication, in accordance with the present disclosure.

FIG. 7 is a block diagram of an example apparatus 700 for wireless communication. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include one or more of a measurement component 708, a determination component 710, a channel estimation component 712, or a demodulation component 714, among other examples.

In some aspects, the apparatus 700 may be configured to perform one or more operations described herein in connection with FIGS. 4 and 5. Additionally, or alternatively, the apparatus 700 may be configured to perform one or more processes described herein, such as process 600 of FIG. 6, or a combination thereof. In some aspects, the apparatus 700 and/or one or more components shown in FIG. 7 may include one or more components of the UE described above in connection with FIG. 2. Additionally, or alternatively, one or more components shown in FIG. 7 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 706. In some aspects, the reception component 702 may include one or more antennas, a demodulator, a MIMO detector, a receive processor, a controller/processor, a memory, or a combination thereof, of the UE described above in connection with FIG. 2.

The transmission component 704 may transmit communications, such as reference signals, control information, data communications, or a combination thereof, to the apparatus 706. In some aspects, one or more other components of the apparatus 706 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modulator, a transmit MIMO processor, a transmit processor, a controller/processor, a memory, or a combination thereof, of the UE described above in connection with FIG. 2. In some aspects, the transmission component 704 may be co-located with the reception component 702 in a transceiver.

The measurement component 708 may measure a first energy level of a DMRS. The measurement component 708 may measure a second energy level of at least one of a TRS or an SSB. The determination component 710 may determine, based at least in part on the first energy level and the second energy level, a DMRS SNR. The channel estimation component 712 may perform, based at least in part on the DMRS SNR, channel estimation for a physical channel associated with a communication to determine an estimated channel. The demodulation component 714 may perform, based at least in part on the estimated channel, demodulation processing for the communication.

The reception component 702 may receive, using a beam that is selected based at least in part on at least one of the TRS or the SSB, the communication on the physical channel.

The measurement component 708 may measure an RS-SNR that is based at least in part on the second energy level.

The determination component 710 may determine the DMRS SNR for at least one of: a slot during which the communication is received, an antenna port used for receiving the communication, or a DMRS port associated with the DMRS.

The measurement component 708 and/or the determination component 710 may measure the DMRS SNR based at least in part on at least one of: the first energy level, the second energy level, a noise level associated with the DMRS, or a RS-SNR that is based at least in part on the second energy level.

The measurement component 708 may measure a noise level associated with the DMRS. The determination component 710 may determine, based at least in part on the first energy level and the noise level, the DMRS SNR.

The determination component 710 may determine, based at least in part on the first energy level and the second energy level, a value. The measurement component 708 may measure an RS-SNR that is based at least in part on the second energy level. The determination component 710 may modify the RS-SNR by the value to obtain the DMRS SNR.

The determination component 710 may determine the value based at least in part on a function of the first energy level and the second energy level.

The determination component 710 may determine, based at least in part on the first energy level and a measured noise level associated with the DMRS, a first SNR. The determination component 710 may modify an RS-SNR, that is based at least in part on the second energy level, by a first value to obtain a second SNR. The determination component 710 may determine whether a ratio, of the first SNR to the second SNR, satisfies a threshold. The determination component 710 may determine that the DMRS SNR is the first SNR if the ratio of the first SNR to the second SNR satisfies the threshold, or the second SNR if the ratio of the first SNR to the second SNR does not satisfy the threshold.

The determination component 710 may determine, based at least in part on the first energy level and a measured noise level associated with the DMRS, a first SNR. The determination component 710 may modify an RS-SNR, that is based at least in part on the second energy level, by a first value to obtain a second SNR. The determination component 710 may modify the second SNR by a second value to obtain a third SNR. The determination component 710 may determine that the DMRS SNR is the first SNR if the first SNR is greater than the third SNR, or the second SNR if the first SNR is less than or equal to the third SNR.

The channel estimation component 712 may perform a delay spread estimation for the channel based at least in part on the DMRS SNR.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

Figure 8:
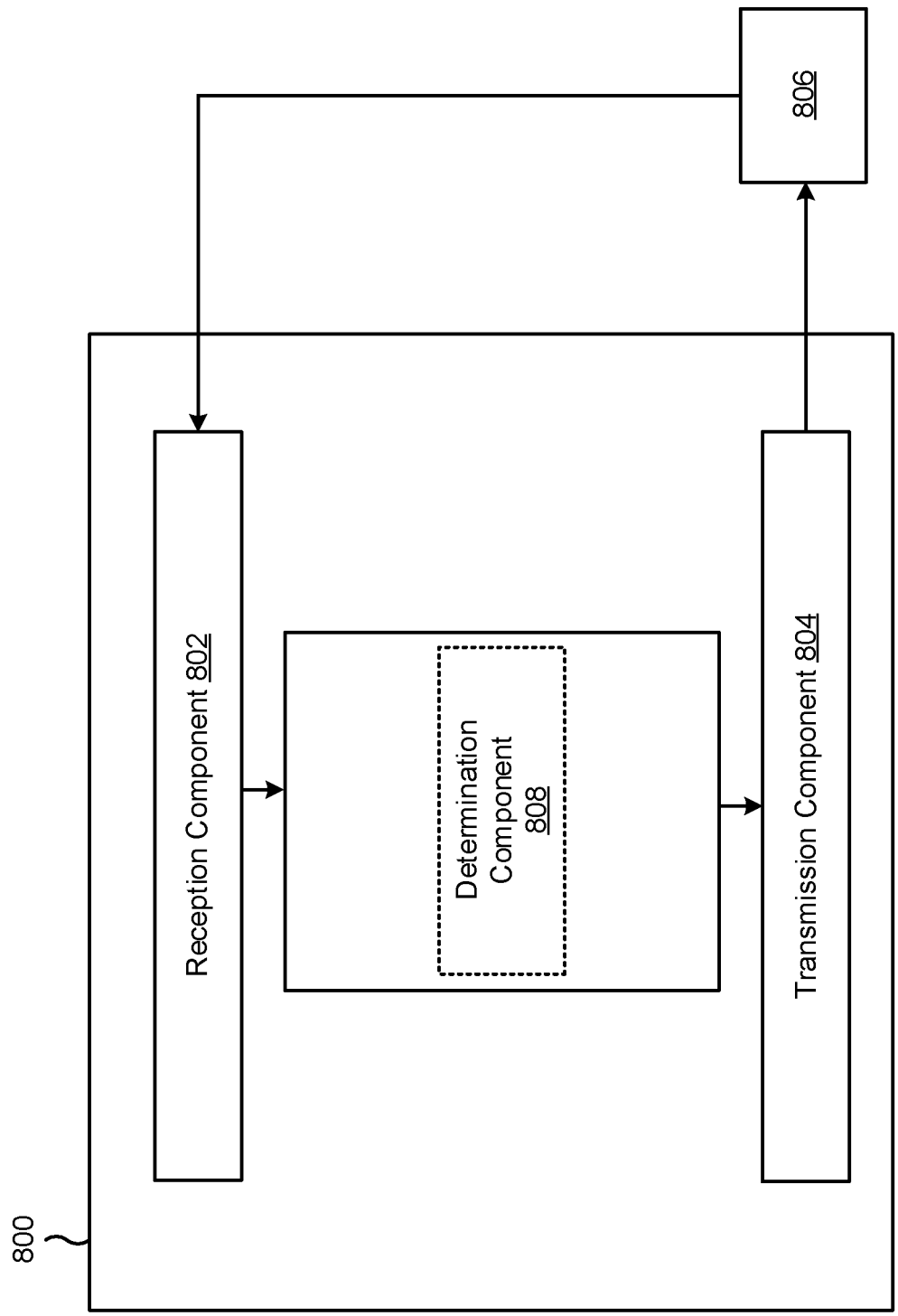

FIG. 8 is a block diagram of an example apparatus 800 for wireless communication. The apparatus 800 may be a base station, or a base station may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include a determination component 808, among other examples.

In some aspects, the apparatus 800 may be configured to perform one or more operations described herein in connection with FIGS. 4 and 5. Additionally, or alternatively, the apparatus 800 may be configured to perform one or more processes described herein, or a combination thereof. In some aspects, the apparatus 800 and/or one or more components shown in FIG. 8 may include one or more components of the base station described above in connection with FIG. 2. Additionally, or alternatively, one or more components shown in FIG. 8 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the base station described above in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the base station described above in connection with FIG. 2. In some aspects, the transmission component 804 may be co-located with the reception component 802 in a transceiver.

The transmission component 804 may transmit, to a UE, a DMRS. The transmission component 804 may transmit, to the UE, at least one of a TRS or an SSB. The transmission component may transmit, to the UE, a communication that is to be demodulated by the UE based at least in part on an energy level of the DMRS (at the UE) and an energy level of the TRS or the SSB (at the UE). The determination component 808 may determine or select a beam to use to transmit the communication based at least on at least one of the TRS or the SSB.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of some aspects of the present disclosure:

Aspect 1: A method of wireless communication performed by a user equipment (UE), comprising: measuring a first energy level of a demodulation reference signal (DMRS); measuring a second energy level of at least one of a tracking reference signal (TRS) or a synchronization signal block (SSB); determining, based at least in part on the first energy level and the second energy level, a DMRS signalto-noise ratio (SNR); performing, based at least in part on the DMRS SNR, channel estimation for a physical channel associated with a communication to determine an estimated channel; and performing, based at least in part on the estimated channel, demodulation processing for the communication.

Aspect 2: The method of aspect 1, further comprising: receiving, using a beam that is selected based at least in part on at least one of the TRS or the SSB, the communication on the physical channel.

Aspect 3: The method of any of aspects 1-2, further comprising: measuring a reference signal SNR (RS-SNR) that is based at least in part on the second energy level.

Aspect 4: The method of any of aspects 1-3, wherein the determination of the DMRS SNR comprises: determining the DMRS SNR for at least one of: a slot during which the communication is received, an antenna port used for receiving the communication, or a DMRS port associated with the DMRS.

Aspect 5: The method of any of aspects 1-4, wherein the determination of the DMRS SNR comprises: measuring the DMRS SNR based at least in part on at least one of: the first energy level, the second energy level, a noise level associated with the DMRS, or a reference signal SNR (RS-SNR) that is based at least in part on the second energy level.

Aspect 6: The method of any of aspects 1-5, wherein the determination of the DMRS SNR comprises: measuring a noise level associated with the DMRS; and determining, based at least in part on the first energy level and the noise level, the DMRS SNR.

Aspect 7: The method of any of aspects 1-5, wherein the determination of the DMRS SNR comprises: determining, based at least in part on the first energy level and the second energy level, a value; measuring a reference signal SNR (RS-SNR) that is based at least in part on the second energy level; and modifying the RS-SNR by the value to obtain the DMRS SNR.

Aspect 8: The method of aspect 7, wherein the determination of the value comprises: determining the value based at least in part on a function of the first energy level and the second energy level.

Aspect 9: The method of any of aspects 1-5, wherein the determination of the DMRS SNR comprises: determining, based at least in part on the first energy level and a measured noise level associated with the DMRS, a first SNR; modifying a reference signal SNR (RS-SNR), that is based at least in part on the second energy level, by a first value to obtain a second SNR; determining whether a ratio, of the first SNR to the second SNR, satisfies a threshold; and determining that the DMRS SNR is: the first SNR if the ratio of the first SNR to the second SNR satisfies the threshold, or the second SNR if the ratio of the first SNR to the second SNR does not satisfy the threshold.

Aspect 10: The method of any of aspects 1-5, wherein the determination of the DMRS SNR comprises: determining, based at least in part on the first energy level and a measured noise level associated with the DMRS, a first SNR; modifying a reference signal SNR (RS-SNR), that is based at least in part on the second energy level, by a first value to obtain a second SNR; modifying the second SNR by a second value to obtain a third SNR; and determining that the DMRS SNR is: the first SNR if the first SNR is greater than the third SNR, or the second SNR if the first SNR is less than or equal to the third SNR.

Aspect 11: The method of any of aspects 1-10, wherein the UE is operating in a millimeter wave operating frequency.

Aspect 12: The method of any of aspects 1-11, wherein performing the channel estimation comprises: performing a delay spread estimation for the channel based at least in part on the DMRS SNR.

Aspect 13: The method of aspect 12, wherein performing the delay spread estimation comprises: measuring a reference signal SNR (RS-SNR) that is based at least in part on the second energy level; comparing the RS-SNR to the DMRS SNR to obtain a difference between the RS-SNR and the DMRS SNR; and performing the delay spread estimation for the channel using the DMRS SNR based at least in part on the difference between the RS-SNR and the DMRS SNR satisfying a collision threshold.

Aspect 14: The method of aspect 13, wherein performing the delay spread estimation for the channel using the DMRS SNR comprises: performing, if the RS-SNR satisfies a reliability threshold, the delay spread estimation for the channel using the DMRS SNR to set a threshold value for separating a signal of the channel from noise over the estimated delay spread of the channel.

Aspect 15: The method of aspect 13, wherein performing the delay spread estimation for the channel using the DMRS SNR comprises: determining, if the RS-SNR does not satisfy a reliability threshold, that the delay spread for the channel is a default value.

Aspect 16: An apparatus for wireless communication at a device, comprising a processor; memory coupled with the processor; and instructions stored in the memory and executable by the processor to cause the apparatus to perform the method of one or more aspects of aspects 1-15.

Aspect 17: A device for wireless communication, comprising a memory and one or more processors coupled to the memory, the memory and the one or more processors configured to perform the method of one or more aspects of aspects 1-15.

Aspect 18: An apparatus for wireless communication, comprising at least one means for performing the method of one or more aspects of aspects 1-15.

Aspect 19: A non-transitory computer-readable medium storing code for wireless communication, the code comprising instructions executable by a processor to perform the method of one or more aspects of aspects 1-15.

Aspect 20: A non-transitory computer-readable medium storing a set of instructions for wireless communication, the set of instructions comprising one or more instructions that, when executed by one or more processors of a device, cause the device to perform the method of one or more aspects of aspects 1-15.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   measuring a first energy level of a demodulation reference signal (DMRS);
   measuring a second energy level of at least one of a tracking reference signal (TRS) or a synchronization signal block (SSB);
   determining, based at least in part on the first energy level and the second energy level, a DMRS signal-to-noise ratio (SNR);
   performing, based at least in part on the DMRS SNR, channel estimation for a physical channel associated with a communication to determine an estimated channel; and
   performing, based at least in part on the estimated channel, demodulation processing for the communication.

2. The method of claim 1, further comprising:
   receiving, using a beam that is selected based at least in part on at least one of the TRS or the SSB, the communication on the physical channel.

3. The method of claim 1, further comprising:
   measuring a reference signal SNR (RS-SNR) that is based at least in part on the second energy level.

4. The method of claim 1, wherein the determination of the DMRS SNR comprises:
   determining the DMRS SNR for at least one of:
      a slot during which the communication is received,
      an antenna port used for receiving the communication, or
      a DMRS port associated with the DMRS.

5. The method of claim 1, wherein the determination of the DMRS SNR comprises:
   measuring the DMRS SNR based at least in part on at least one of:
      the first energy level,
      the second energy level,
      a noise level associated with the DMRS, or
      a reference signal SNR (RS-SNR) that is based at least in part on the second energy level.

6. The method of claim 1, wherein the determination of the DMRS SNR comprises:
   measuring a noise level associated with the DMRS; and
   determining, based at least in part on the first energy level and the noise level, the DMRS SNR.

7. The method of claim 1, wherein the determination of the DMRS SNR comprises:
   determining, based at least in part on the first energy level and the second energy level, a value;
   measuring a reference signal SNR (RS-SNR) that is based at least in part on the second energy level; and
   modifying the RS-SNR by the value to obtain the DMRS SNR.

8. The method of claim 7, wherein the determination of the value comprises:
   determining the value based at least in part on a function of the first energy level and the second energy level.

9. The method of claim 1, wherein the determination of the DMRS SNR comprises:
   determining, based at least in part on the first energy level and a measured noise level associated with the DMRS, a first SNR;
   modifying a reference signal SNR (RS-SNR), that is based at least in part on the second energy level, by a first value to obtain a second SNR;
   determining whether a ratio, of the first SNR to the second SNR, satisfies a threshold; and
   determining that the DMRS SNR is:
      the first SNR if the ratio of the first SNR to the second SNR satisfies the threshold, or
      the second SNR if the ratio of the first SNR to the second SNR does not satisfy the threshold.

10. The method of claim 1, wherein the determination of the DMRS SNR comprises:
    determining, based at least in part on the first energy level and a measured noise level associated with the DMRS, a first SNR;
    modifying a reference signal SNR (RS-SNR), that is based at least in part on the second energy level, by a first value to obtain a second SNR;
    modifying the second SNR by a second value to obtain a third SNR; and
    determining that the DMRS SNR is:
       the first SNR if the first SNR is greater than the third SNR, or
       the second SNR if the first SNR is less than or equal to the third SNR.

11. The method of claim 1, wherein performing the channel estimation comprises:
  performing a delay spread estimation for the physical channel based at least in part on the DMRS SNR.

12. The method of claim 11, wherein performing the delay spread estimation comprises:
  measuring a reference signal SNR (RS-SNR) that is based at least in part on the second energy level;
  comparing the RS-SNR to the DMRS SNR to obtain a difference between the RS-SNR and the DMRS SNR; and
  performing the delay spread estimation for the physical channel using the DMRS SNR based at least in part on the difference between the RS-SNR and the DMRS SNR satisfying a collision threshold.

13. The method of claim 12, wherein performing the delay spread estimation for the physical channel using the DMRS SNR comprises:
  performing, if the RS-SNR satisfies a reliability threshold, the delay spread estimation for the physical channel using the DMRS SNR to set a threshold value for separating a signal of the physical channel from noise over the estimated delay spread of the physical channel.

14. The method of claim 12, wherein performing the delay spread estimation for the physical channel using the DMRS SNR comprises:
  determining, if the RS-SNR does not satisfy a reliability threshold, that the delay spread for the physical channel is a default value.

15. A user equipment (UE) for wireless communication, comprising:
  one or more memories; and
  one or more processors, coupled to the one or more memories, configured to cause the UE to:
    measure a first energy level of a demodulation reference signal (DMRS);
    measure a second energy level of at least one of a tracking reference signal (TRS) or a synchronization signal block (SSB);
    determine, based at least in part on the first energy level and the second energy level, a DMRS signal-to-noise ratio (SNR);
    perform, based at least in part on the DMRS SNR, channel estimation for a physical channel associated with a communication to determine an estimated channel; and
    perform, based at least in part on the estimated channel, demodulation processing for the communication.

16. The UE of claim 15, wherein the one or more processors are further configured to cause the UE to:
  receive, using a beam that is selected based at least in part on at least one of the TRS or the SSB, the communication on the physical channel.

17. The UE of claim 15, wherein one or more processors are further configured to cause the UE to:
  measure a reference signal SNR (RS-SNR) that is based at least in part on the second energy level.

18. The UE of claim 15, wherein the one or more processors, to determine the DMRS SNR, are configured to cause the UE to:
  determine the DMRS SNR for at least one of:
    a slot during which the communication is received,
    an antenna port used for receiving the communication, or
    a DMRS port associated with the DMRS.

19. The UE of claim 15, wherein the one or more processors, to determine the DMRS SNR, are configured to cause the UE to:
  measure the DMRS SNR based at least in part on at least one of:
    the first energy level,
    the second energy level,
    a noise level associated with the DMRS, or
    a reference signal SNR (RS-SNR) that is based at least in part on the second energy level.

20. The UE of claim 15, wherein the one or more processors, to determine the DMRS SNR, are configured to cause the UE to:
  measure a noise level associated with the DMRS; and
  determine, based at least in part on the first energy level and the noise level, the DMRS SNR.

21. The UE of claim 15, wherein the one or more processors, to determine the DMRS SNR, are configured to cause the UE to:
  determine, based at least in part on the first energy level and the second energy level, a value;
  measure a reference signal SNR (RS-SNR) that is based at least in part on the second energy level; and
  modify the RS-SNR by the value to obtain the DMRS SNR.

22. The UE of claim 21, wherein the one or more processors, to determine the value, are configured to cause the UE to:
  determine the value based at least in part on a function of the first energy level and the second energy level.

23. The UE of claim 15, wherein the one or more processors, to determine the DMRS SNR, are configured to cause the UE to:
  determine, based at least in part on the first energy level and a measured noise level associated with the DMRS, a first SNR;
  modify a reference signal SNR (RS-SNR), that is based at least in part on the second energy level, by a first value to obtain a second SNR;
  determine whether a ratio, of the first SNR to the second SNR, satisfies a threshold; and
  determine that the DMRS SNR is:
    the first SNR if the ratio of the first SNR to the second SNR satisfies the threshold, or
    the second SNR if the ratio of the first SNR to the second SNR does not satisfy the threshold.

24. The UE of claim 15, wherein the one or more processors, to determine the DMRS SNR, are configured to cause the UE to:
  determine, based at least in part on the first energy level and a measured noise level associated with the DMRS, a first SNR;
  modify a reference signal SNR (RS-SNR), that is based at least in part on the second energy level, by a first value to obtain a second SNR;
  modify the second SNR by a second value to obtain a third SNR; and
  determine that the DMRS SNR is:
    the first SNR if the first SNR is greater than the third SNR, or
    the second SNR if the first SNR is less than or equal to the third SNR.

25. The UE of claim 15, wherein the one or more processors, to perform the channel estimation, are configured to cause the UE to:
  perform a delay spread estimation for the physical channel based at least in part on the DMRS SNR.

26. The UE of claim 25, wherein one or more processors, to perform the delay spread estimation, are configured to cause the UE to:
  measure a reference signal SNR (RS-SNR) that is based at least in part on the second energy level;
  compare the RS-SNR to the DMRS SNR to obtain a difference between the RS- SNR and the DMRS SNR; and
  perform the delay spread estimation for the physical channel using the DMRS SNR based at least in part on the difference between the RS-SNR and the DMRS SNR satisfying a collision threshold.

27. The UE of claim 26, wherein the one or more processors, to perform the delay spread estimation for the physical channel using the DMRS SNR, are configured to cause the UE to:
  perform, if the RS-SNR satisfies a reliability threshold, the delay spread estimation for the physical channel using the DMRS SNR to set a threshold value for separating a signal of the physical channel from noise over the estimated delay spread of the physical channel.

28. The UE of claim 26, wherein the one or more processors, to perform the delay spread estimation for the physical channel using the DMRS SNR, are configured to cause the UE to:
  determine, if the RS-SNR does not satisfy a reliability threshold, that the delay spread for the physical channel is a default value.

29. A non-transitory computer-readable medium storing a set of instructions for wireless communication, the set of instructions comprising:
  one or more instructions that, when executed by one or more processors of a user equipment (UE), cause the UE to:
    measure a first energy level of a demodulation reference signal (DMRS);
    measure a second energy level of at least one of a tracking reference signal (TRS) or a synchronization signal block (SSB);
    determine, based at least in part on the first energy level and the second energy level, a DMRS signal-to-noise ratio (SNR);
    perform, based at least in part on the DMRS SNR, channel estimation for a physical channel associated with a communication to determine an estimated channel; and
    perform, based at least in part on the estimated channel, demodulation processing for the communication.

30. An apparatus for wireless communication, comprising:
  means for measuring a first energy level of a demodulation reference signal (DMRS);
  means for measuring a second energy level of at least one of a tracking reference signal (TRS) or a synchronization signal block (SSB);
  means for determining, based at least in part on the first energy level and the second energy level, a DMRS signal-to-noise ratio (SNR);
  means for performing, based at least in part on the DMRS SNR, channel estimation for a physical channel associated with a communication to determine an estimated channel; and
  means for performing, based at least in part on the estimated channel, demodulation processing for the communication.

* * * * *